(12) United States Patent
Hughes et al.

(10) Patent No.: US 9,226,219 B2
(45) Date of Patent: Dec. 29, 2015

(54) SYSTEM AND METHOD FOR ROUTE LEARNING AND AUTO-CONFIGURATION

(75) Inventors: Sterling Hughes, Oakland, CA (US); Peter Hunt, Sunnyvale, CA (US); Jana Van Greunen, Woodside, CA (US)

(73) Assignee: Silver Spring Networks, Redwood City, CA (US)

( * ) Notice: Subject to any disclaimer, the term of this patent is extended or adjusted under 35 U.S.C. 154(b) by 530 days.

(21) Appl. No.: 13/334,037

(22) Filed: Dec. 21, 2011

(65) Prior Publication Data

US 2013/0163466 A1      Jun. 27, 2013

(51) Int. Cl.
*H04W 40/24* (2009.01)
*H04W 48/12* (2009.01)
*H04W 48/14* (2009.01)

(52) U.S. Cl.
CPC ............. *H04W 40/24* (2013.01); *H04W 48/12* (2013.01); *H04W 48/14* (2013.01)

(58) Field of Classification Search
None
See application file for complete search history.

(56) References Cited

U.S. PATENT DOCUMENTS

| | | | |
|---|---|---|---|
| 7,379,981 B2 | 5/2008 | Elliott et al. | |
| 2003/0202477 A1* | 10/2003 | Zhen et al. | 370/248 |
| 2007/0297452 A1* | 12/2007 | Lee et al. | 370/469 |
| 2008/0219186 A1* | 9/2008 | Bell et al. | 370/254 |
| 2008/0259902 A1* | 10/2008 | Park | 370/349 |
| 2009/0238111 A1* | 9/2009 | Hirano et al. | 370/328 |
| 2010/0220632 A1* | 9/2010 | Javaid et al. | 370/255 |
| 2011/0310770 A1* | 12/2011 | Liang et al. | 370/254 |
| 2013/0094536 A1* | 4/2013 | Hui et al. | 375/133 |

* cited by examiner

*Primary Examiner* — Faruk Hamza
*Assistant Examiner* — Cassandra Decker
(74) *Attorney, Agent, or Firm* — Artegis Law Group, LLP (57) ABSTRACT

In an embodiment of a wireless network, when a node joins the network and receives a routing advertisement, such a node transmits the routing advertisement to all its neighbors. The node then receives transmission from the neighboring nodes indicating interest in joining the advertised network. If more than a threshold number of neighboring nodes are interested in the advertised route, the newly joining node inserts the route advertisement in a beacon transmission. If there is not a threshold level of interest, the node unicasts only to the neighbors who indicated interest in the advertised network. In an embodiment, the node repeats the above steps on a predetermined time basis (e.g., one per day) in order to determine interest in the advertised route that may have newly arisen.

23 Claims, 7 Drawing Sheets

SYSTEM AND METHOD FOR ROUTE LEARNING AND AUTO-CONFIGURATION

BACKGROUND

1. Technical Field

Embodiments of the present invention relate generally to wireless digital communication technology and, more specifically, to a system and method for route learning and auto-configuration.

2. Description of the Related Art

A conventional wireless mesh network includes a plurality of nodes, each incorporating a digital radio transceiver. A given node may transmit payload data to one or more other nodes via the digital radio transceiver. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network.

The digital radio transceiver may implement specific modulation and spectral utilization techniques to satisfy a particular set of technical requirements. For example, multi-channel frequency hopping spread spectrum (FHSS) may be implemented to avoid potentially excessive interference among nodes that are attempting to transmit on a common radio frequency channel in an arbitrary window of time. FHSS involves transmitting data on one radio frequency channel for up to a specified maximum time duration and subsequently transmitting on a different radio frequency channel for up to another specified maximum time duration. FHSS systems typically follow a specific channel hop sequence, which both the transmitter and receiver need to follow to maintain a reliable communications channel. The transmitter reduces average radio frequency energy associated with a given channel by hopping to a different channel after a specified maximum time duration, thereby reducing a probability of interference among nodes attempting to transmit on the same channel.

FHSS systems conventionally require the transmitter and receiver pair to be synchronized, which is typically accomplished via a synchronization procedure conducted between the transmitter and receiver. Overhead associated with the synchronization procedure and related transmission latencies can substantially reduce overall transmission efficiency and network throughput.

In a network that is typically represented by a utility network, the distribution part of the network may include a plurality of nodes located at end-pint utility meters with a smaller number of nodes acting as relays, and one or more Gateways providing egress to these end-point nodes. The utility network may also consist of the infrastructure part (substations, feeder stations, transformer locations, generation facilities) that is populated with monitoring and control sensors. These devices may also be part of the utility network that may be directly connected to the utility server via WAN or connected to the utility server via Gateways in the wireless network. The routing algorithm may be structured in such a fashion that these infrastructure nodes, and any selected distribution end-point nodes can establish bi-directional connectivity with minimal latency and via the fastest path. In some embodiments, these infrastructure nodes and select end-point nodes can have multi-egress capability to increase network reliability.

In a conventional network, routing advertisements from a first node are inserted into a beacon packet so that the node's neighbors receive the packet. In such a network, extra transmit time is not needed as would be necessary if unicasting to each neighbor but as a node joins more networks, a beacon packet can become large and prone to being dropped. Also, the beacon packet can be more prone to overlapping with other transmissions. Furthermore, because the beacon packet has limited size, more time may be needed to send multiple routing advertisements than cannot fit within a single beacon packet. Also, because the beacon is not retried at the link-layer, it can be important that it has a high probability of being received on a first transmission. Increasing the probability of being received on a first transmission, however, places further undesirable constraints on the network.

As the foregoing illustrates, what is needed in the art is a more efficient technique for handling routing overhead in a network such as a wireless mesh network.

SUMMARY

Embodiments of the present invention include methods for reducing routing overhead in a network. A described embodiment includes a distribution automation network implemented as a multi-channel frequency hopping spread spectrum.

In an embodiment, when a node joins a network and receives a routing advertisement, such a node transmits the routing advertisement to all its neighbors. The node then receives transmission from the neighboring nodes indicating interest in joining the advertised network. If more than a threshold number of neighboring nodes are interested in the advertised route, the newly joining node inserts the route advertisement in a beacon transmission. If there is not a threshold level of interest, the node unicasts only to the neighbors who indicated interest in the advertised network. In an embodiment, the node repeats the above steps on a predetermined time basis (e.g., one per day) in order to determine interest in the advertised route that may have newly arisen.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. It will, however, be apparent to one of skill in the art that the present invention may be practiced without one or more of these specific details. In other instances, well-known features have not been described in order to avoid obscuring the present invention.

Figure 1A:
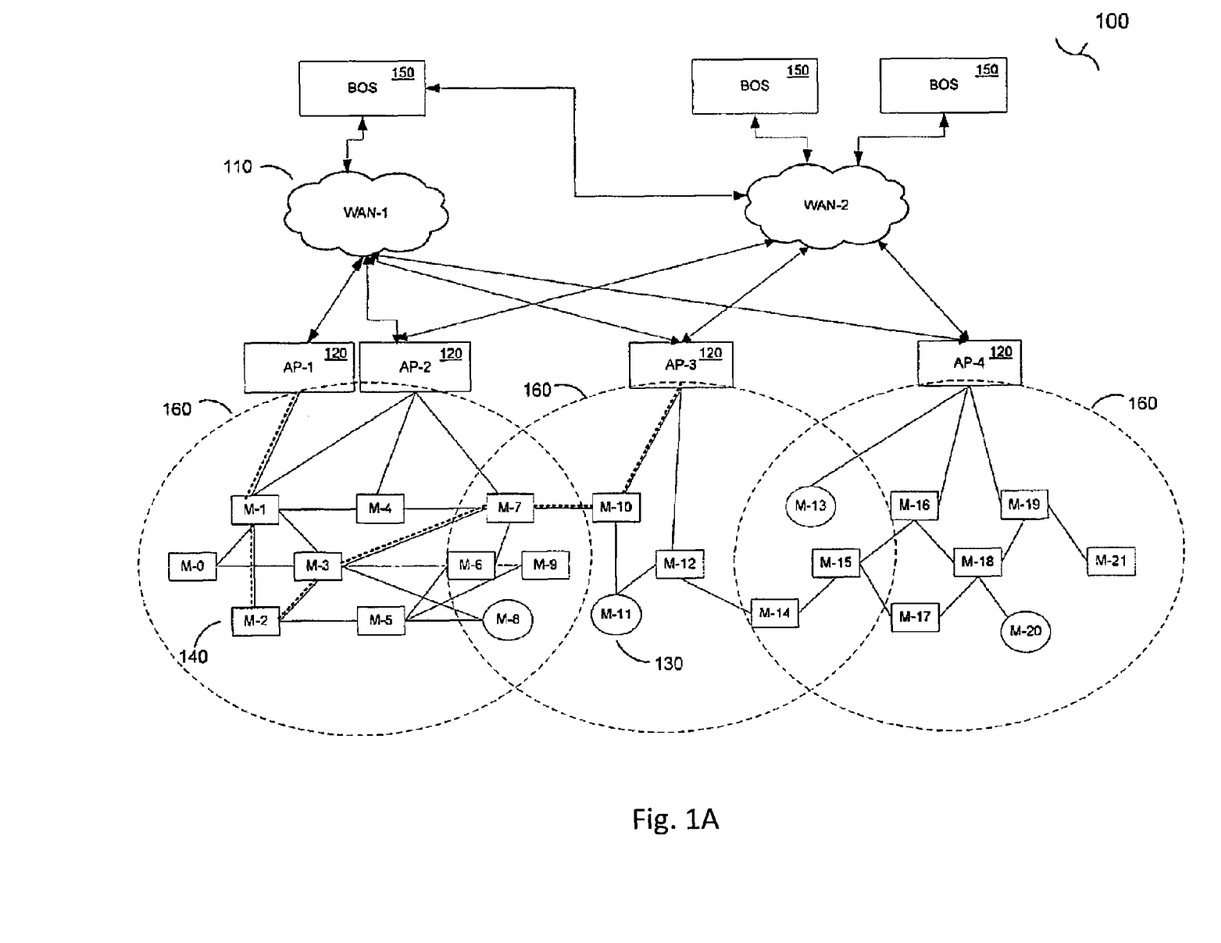
FIG. 1A illustrates the overall network architecture of one possible embodiment.

Referring to FIG. 1A, a communications network may include a plurality of nodes 140 and 130 linked to one another and to one or more access points 120 within wireless LANs 160. Unless otherwise noted, access points (APs) 120 are also called gateway as known to those of ordinary skill in the art. APs 120 may be linked to one or more back office utility servers (BOS) 150 via one or more wide area networks (WANs) 110. BOS 150 may be implemented on one or more computing devices.

In an embodiment implemented as a utility network, LANs 160 may be neighborhood area networks (NANs) corresponding to a neighborhood or service area for the utility. As shown in the example embodiment, multiple LANs 160 may be used, which may or may not overlap. The nodes may be any type of network device. Examples of network devices, or nodes, include utility nodes, which may include a utility meter or may connect to a utility meter. A utility meter is a device that is capable of measuring a metered quantity, typically a commodity like electricity, water, natural gas, etc. Utility nodes that connect to a utility meter may include a network interface card (NIC) for communicating on a network, may include one or more RF transceivers for communicating on one or more wireless LANs, and may include one or more utility meter interface devices (a given utility node may interface with multiple meters, which may or may not meter different commodities, such as electricity, gas, water, etc.).

Utility nodes may also include an in-premise device interface to connect to in-premise devices through an in-premise network (which may or may not be a wireless network). An in-premise device interface connects to in-premise devices so as to provide a communications link between the utility node and the in-premise devices.

Additionally, the utility node may provide a communications link between the in premise devices and the wireless communications network connected to the utility node.

Other examples of network devices include communication devices, such as set-top boxes (as may be used in cable television or satellite television delivery), household appliances, computers or computing devices, networking devices such as relay, gateways, routers, phones, battery storage devices, transportation devices, transportation vehicles, entertainment devices, or other devices as may be found in a home, business, roadway, parking lot, or other location.

Wireless LAN 160 may be any type of wireless network and may use any frequency, communications channel or communications protocol as would be known to those of ordinary skill in the art. In embodiments of the present invention, one or more of wireless LANs 160 are FHSS (Frequency-Hopping Spread Spectrum) networks or DSSS (Direct Sequence Spread Spectrum) networks.

In an embodiment, in an initial network discovery phase, a node may use a process to scan through slots or channels to get to its neighbors and to get acknowledgement responses and an initial value of link quality estimates from those discovered neighbors. This initial link quality estimate may be used to select a number of best upstream neighbors to talk to (the number selected may be configurable).

In an embodiment, a node proceeds with a registration process with its upstream nodes when the node intends to use these upstream nodes for egress to another network. In response to the registration message from the node, an upstream node adds the registering downstream node to the downstream routing table entries maintained by the upstream node. The upstream nodes may also proceed to maintain up-to-date timing information about the registering node in response to the registering by the downstream node. Nodes routing through each other are preferably set up to exchange timing information periodically in order to remain in synchronization.

The registration of a node with one or more of the APs may then take place. This registration process can prompt the APs to add the registering node to their routing tables and insure that the status of the node is up to date. The registration of a node with an AP may occur periodically but more infrequently than the registration with an upstream node. In an embodiment, the frequency is on the order of once every 12 hours.

Each node (e.g., 130 and 140) in the wireless communication network may be identified for end-to-end routing in any particular network by a unique address such as an IPv6 address. IPv6 addresses are typically composed of two logical parts: a 64-bit network prefix and a 64-bit host part. Upon successful registration by a node with the AP, the AP may hand the node data packets in the form of a TLV (Type Length Value) containing the network configuration, including the IPv6 globally routable prefix associated with the subnet the node is joining. The node may then send a Dynamic DNS update request (RFC 2136) to the Network Host Utility System DNS server. When a utility server (e.g., BOS 150) wants to send traffic into a wireless LAN, it may resolve the node's DNS name into an IPv6 address for Layer 3 (IP) routing through the WAN to the correct AP. If the WAN is IPv4-based, IPv6 packets may be encapsulated within IPv4 with appropriate prefixes for tunneling through the IPv4 cloud. At BOS 150 and the AP 120, the received IPv6 packet would be decapsulated. Other addressing schemes as known in the art are also appropriate for use with embodiments of the present invention.

Link Layer Addressing

Each node (e.g., 130, 140) may be identified for routing in the Wireless LAN by a unique link layer address assigned to its radio interface. For example, each node may have only a single interface. Other embodiments can have multiple discrete link layer addresses. Link layer address is typically 8 bytes long and is the device's MAC address. The link layer broadcast address may be hex ff:ff:ff:ff:ff:ff (all ones). Packets transmitted with this local broadcast address can be processed by those who receive them.

Routing Subsystem

A routing subsystem can utilize the code entity DLF (Data Link Forwarder) for Layer 2 routing and the code entity MLME (Media Access Control Sub-Layer Management Entity) for acquiring neighbor nodes and maintaining timing information between neighbors. The DLF interfaces to the MLME through a set of APIs.

Neighbor Scan and Discovery

In an embodiment of the present invention, a node may discover neighboring nodes using two basic processes: broadcast discovery and neighbor queries. When a node comes up, the MLME may find all of the node's adjacencies (or directly connected RF links) through a broadcast discovery process. It may do this randomly to determine when it should start sending broadcast discovery frames and then choose the channel on which to send the broadcast discovery frame (channel selection may be done randomly). It may then cycle through every slot, transmitting each successive broadcast discovery frame on the next slot, and wrapping at the last slot.

Once the discovery process has found a neighbor (adjacency), or a set of neighbors, the MLME may then query the discovered neighbors for their direct neighbors (the direct neighbors can be provided in response). This may be done to discover the network environment more quickly (in contrast to broadcasting a large number of frames in hopes of contacting any one particular device). The neighbor query mechanism can be a simple query/response. For example, a node receiving a neighbor query applies the criteria to the nodes in its list, and the nodes that "match" the criteria are placed in the neighbor response. If no criterion is given, all the nodes in the list may be placed in the neighbor response.

Figure 2:
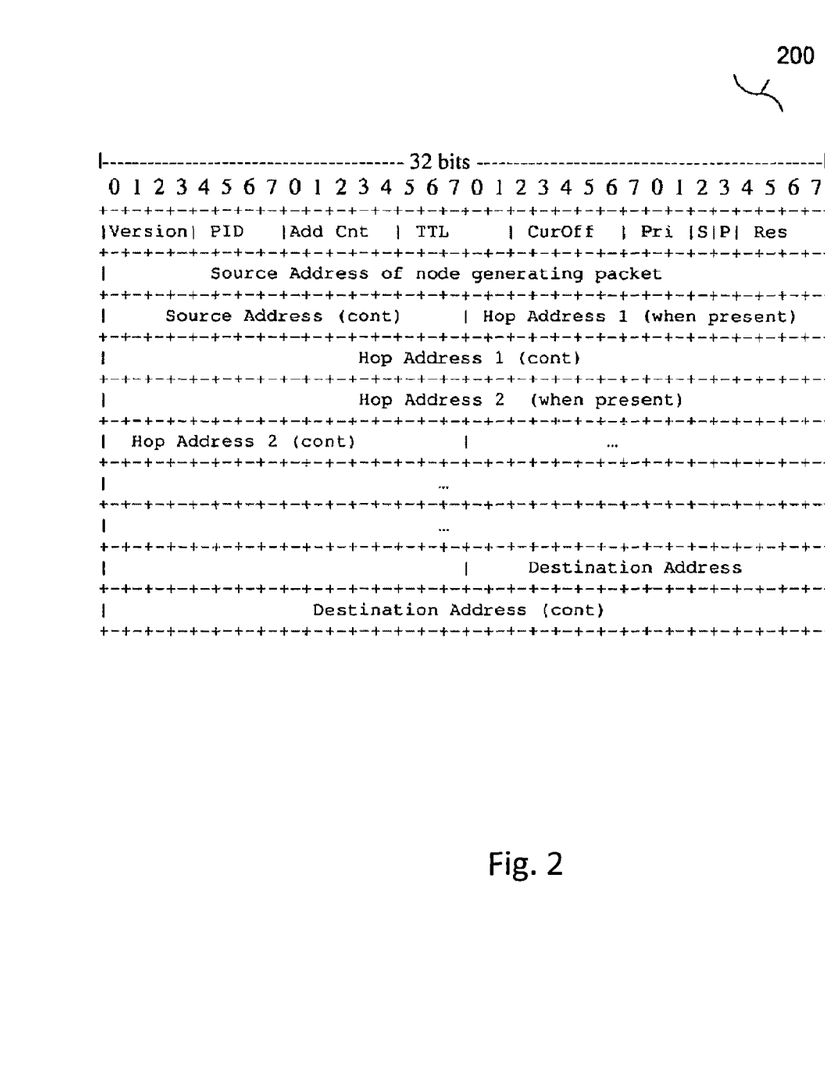
FIG. 2 shows an exemplary format of the Network Advertisement message sent out by a node about the best path to a particular network known by it.

Using the list of neighbors built up by the MLME, the DLF may try and find advertised egress routes. It may accomplish this task by listening for "Network Advertisement" (NADV) messages from the nodes in the MLME's neighbor table. The NADV message may advertise a set of egress routes, which may include the path cost and hop count of the egress routes. Path cost can be the lowest cost associated with that egress, amongst all candidate paths. Hop count can be the highest number of hops that are taken to reach that egress. Hop count can be used to prevent routing loops, and may not be used in conjunction with the path cost. An example of the format of the NADV message is shown in FIG. 2. The Destination MAC address can be the MAC address of the node originating the network advertisement. In most cases it can be the egress point (or the Gateway) since networks can be identified by their egress nodes.

Figure 3:
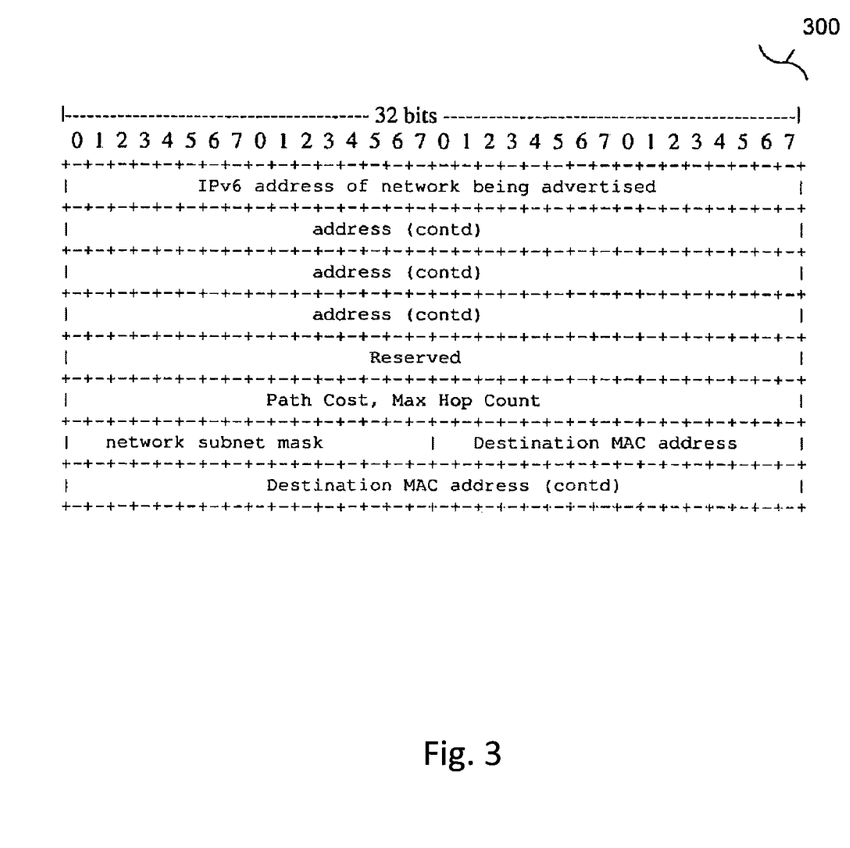
FIG. 3 is a simplified representation of an exemplary routing table constructed at a node after it receives network advertisements from its neighbors.

From the advertisements received in the form of NADV messages, each node can construct a routing table listing the available networks, the egress node identifying each of the networks, and the available paths to that egress node. Each of the available paths can be described with a next hop, flags describing the type of path, and the link and path costs. An example of the information that may be captured in the routing table is laid out in FIG. 3.

From the routing table information, nodes may construct a forwarding or next-hop table with a list of destination MAC addresses, a type associated with each address, and the path cost for it. In one embodiment, the type reflects the selection preference associated with the destination and may be one of the five: source-routed, hop-by-hop, direct adjacency, breadcrumb, or local.

Node Registration with Upstream Neighbors

Each node may explicitly register with the upstream nodes it intends to use in a network. This registration means that the upstream node may now attempt to keep up-to-date timing information about the registering node, and keep a downstream routing table entry. Thus, traffic cannot only flow towards the egress, but also back to the node (downstream).

The node registers with its upstream node by sending it an "Upstream Register" message. The "Upstream Register" message may contain the device's type, and a neighborhood health metric. The neighborhood health metric can be used to cull downstream nodes when an upstream becomes overloaded. Devices with a low neighborhood health metric (and therefore presumably low path diversity) can be preferentially selected before devices with high neighborhood health metrics.

Managing Routing Advertisement Traffic for Multiple Networks

In a Distribution Automation network, as well as other types of networks, it is desirable to reduce routing overhead where there may exist small groups of nodes that are routing each other on different subnets in a relay infrastructure that provides connectivity among the nodes of interest (e.g., adjacency as discussed above). See FIG. 1A. Embodiments of the present invention address these issues.

In a conventional network, routing advertisements from a first node are inserted into a beacon packet so that the node's neighbors receive the packet. In such a network, extra transmit time is not needed as would be necessary if unicasting to each neighbor but as a node joins more networks, a beacon packet can become large and prone to being dropped. Also, the beacon packet can be more prone to overlapping with other transmissions. Furthermore, because the beacon packet has limited size, more time may be needed to send multiple routing advertisements than cannot fit within a single beacon packet. Also, because the beacon is not retried at the link-layer, it can be important that it has a high probability of being received on a first transmission. Increasing the probability of being received on a first transmission, however, places further undesirable constraints on the network.

The present invention addresses these and other issues by providing methods for a node to decide which routing advertisements to include in beacons and which to include in unicasts. In this way, overall network traffic generated by routing is reduced. Among other things, embodiments of the present invention improve the probability of a successful beacon transmission. These and other aspects of the invention are more fully explained in the discussion of FIGS. 4-6 below.

Figure 4:
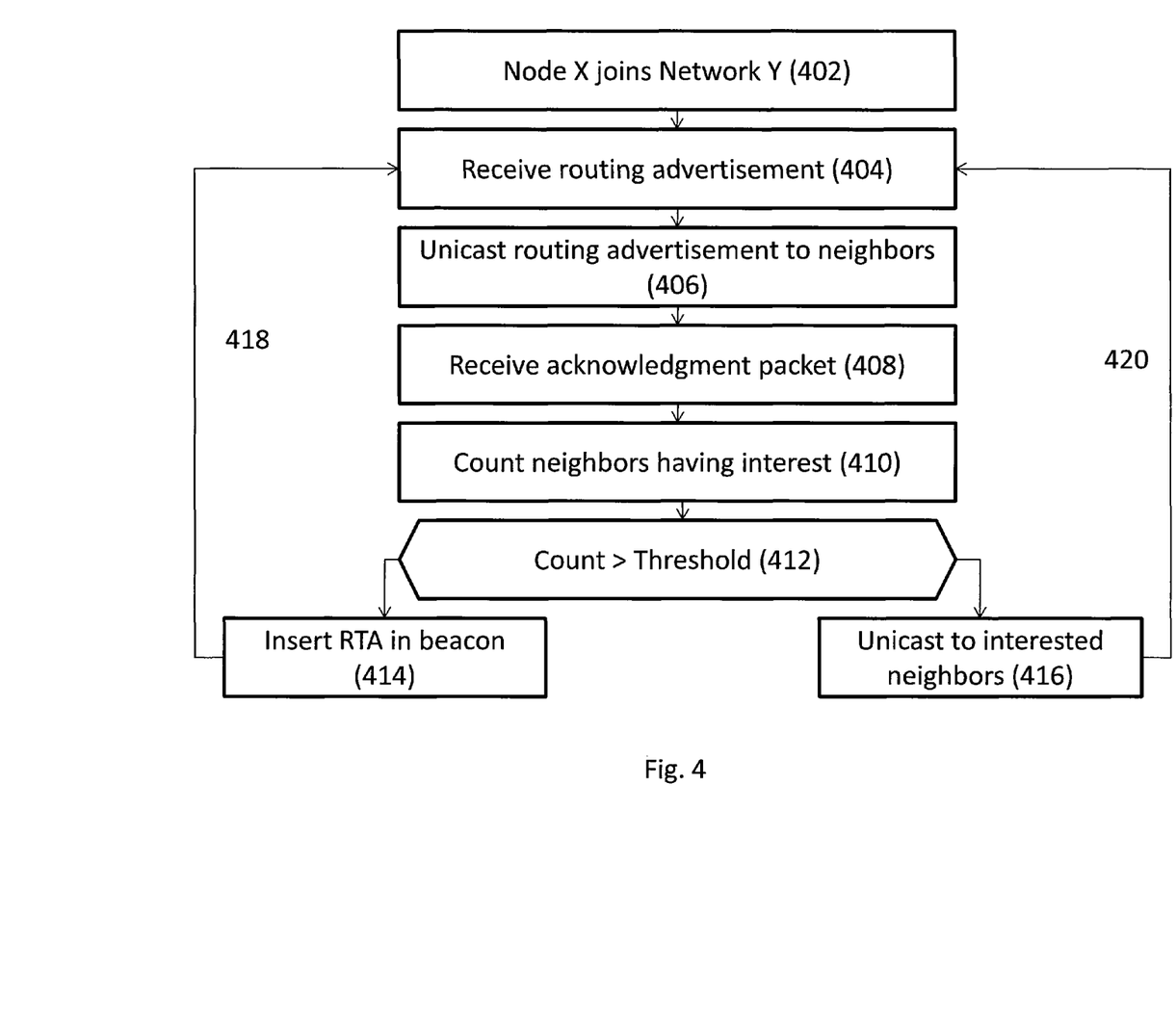
FIG. 4 is a flowchart for a method according to an embodiment of the present invention for reducing routing overhead in a network.

An embodiment of the present invention for routing overhead is shown in the flowchart of FIG. 4. Those of ordinary skill in the art, however, will understand that the scope of the present invention is in no way limited by the disclosed examples. For example, embodiments of the present invention may implement steps of the disclosed methods in a different order.

Figure 1B:
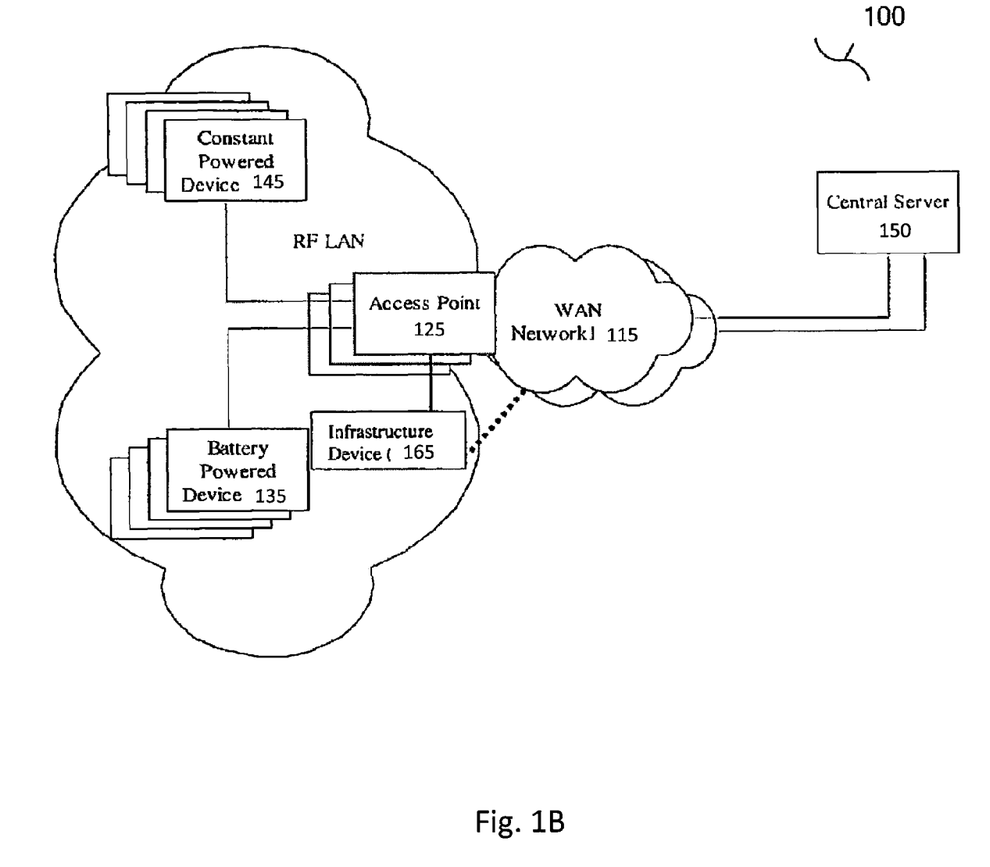
FIG. 1B is an alternate representation of the overall network architecture of one possible embodiment.

As shown in FIG. 4, a Node X (e.g., node 130 or 140 of FIG. 1) joins Network Y at step 402. After joining Network Y, Node X receives a routing advertisement at step 404. Node X then unicasts the received routing advertisement to its neighbors at step 406. In an acknowledgement packet received at step 408, neighbors can express interest in joining the announced network. At step 410 a count is maintained of the number of neighboring nodes interested in the advertised route. If more than a certain threshold of neighbors are interested in the route (step 412), the RTA is inserted in a subsequent beacon at step 414. If a threshold interest is not achieve, the newly Node X unicasts only to the neighbors who indicated interest at step 416.

In an embodiment, Node X repeats this scan of all neighbors on a predetermined basis (e.g., once a day or per time period in case the network configuration has changed) as indicated by branches 418 and 420. In this way, any given node can obtain route information for newly-discovered nodes that may be of interest.

Figure 5:
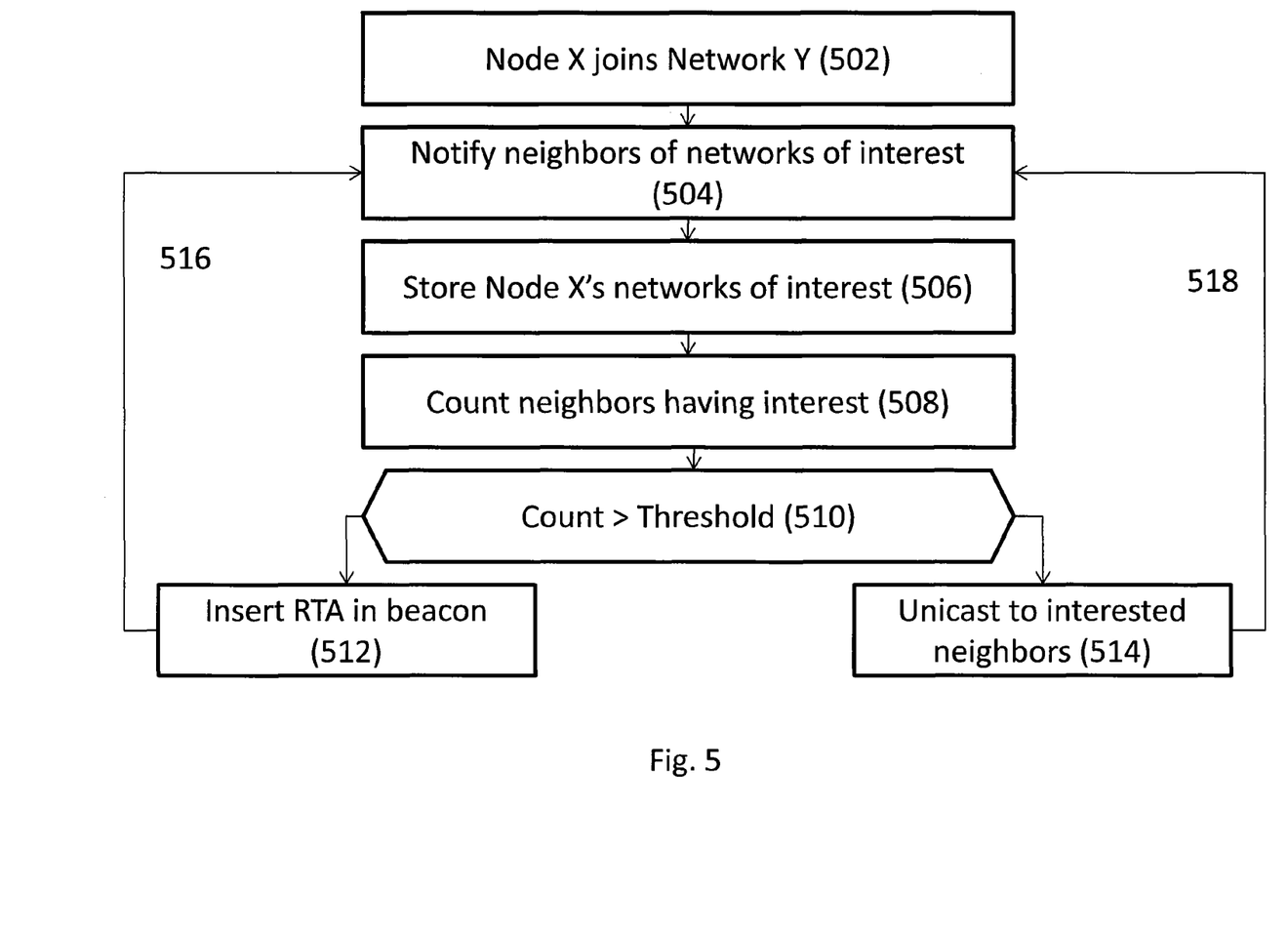
FIG. 5 is a flowchart for a method according to an embodiment of the present invention for reducing routing overhead in a network.

Another embodiment of the present invention for reducing routing overhead is shown in the flowchart of FIG. 5. Those of ordinary skill in the art, however, will understand that the scope of the present invention is in no way limited by the disclosed examples. For example, embodiments of the present invention may implement steps of the disclosed methods in a different order.

As shown in FIG. 5, Node X is configured to join Network Y at step 502. After joining the network, Node X notifies all of its neighbors its networks of interest (i.e., networks of interest to Node X) at step 504. At step 506, the neighbors store information regarding such networks of interest from Node X. Note that in applying the method of FIG. 5 multiple times, cumulative stored information may relate to several neighboring nodes. As other nodes join the network and express interest in the same network as identified by Node X, a count of neighbors having interest in the same network is maintained at step 508. If more than a threshold of neighbors are interested in the same route (step 510), the network information is inserted into the RTA in a subsequent beacon at step 512. If a threshold interest is not achieve, the network information is unicast only to the neighbors who indicated interest at step 514.

In an embodiment, the method of FIG. 5 is repeated on a predetermined basis (e.g., once a day or per time period in case the network configuration has changed) as indicated by branches 516 and 518. In this way, any given node can advertise its networks of interest for newly-discovered nodes.

Figure 6:
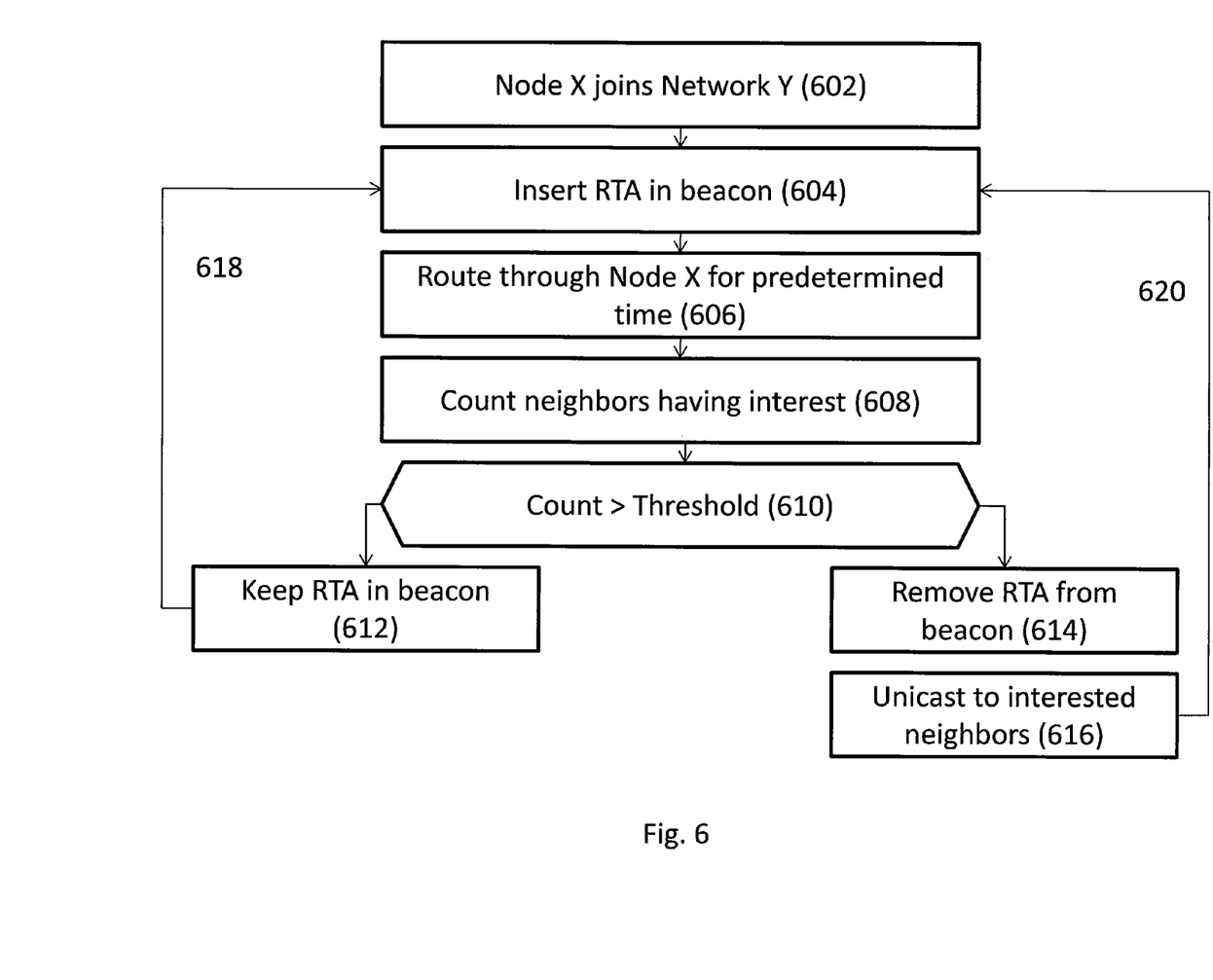
FIG. 6 is a flowchart for a method according to an embodiment of the present invention for reducing routing overhead in a network.

Another embodiment of the present invention for reducing routing overhead in a network is shown in the flowchart of FIG. 6. Those of ordinary skill in the art, however, will understand that the scope of the present invention is in no way limited by the disclosed examples. For example, embodiments of the present invention may implement steps of the disclosed methods in a different order.

As shown in FIG. 6, Node X is configured to join a network Y at step 602. After joining the network, Node X inserts the RTA for the newly joined network in a beacon at step 604. For a predetermined time, Node X is made available to route to the network Y at step at step 606. During such predetermined time, a count is maintained at step 508 of neighbors that were interested in routing to network Y. If more than a certain threshold of neighbors are interested in network Y (step 610), the RTA is kept in the beacon at step 612. If a threshold interest is not achieve, the RTA is removed from the beacon at step 614 and at step 616 Node X unicasts to only those neighbors interested in network Y.

In an embodiment, the method of FIG. 6 is repeated on a predetermined basis (e.g., once a day or per time period in case the network configuration has changed) as indicated by branches 618 and 620.

Many variations are possible as would be understood by those of ordinary skill in the art. For example, in other embodiments of the present invention, two or more of the methods of FIGS. 4-6 can be implemented in a network. Also, using methods according to embodiment of the present invention, it may be possible that a node may need to broadcast a large number of route advertisements that may not fit in a single beacon. In such a situation, the route advertisements may be distributed among multiple beacons. In an embodiment, this is achieved in multiple successive beacons. In another embodiment designed to assure that a route does not expire, the beacon interval is a large multiple of the route expiry time, allowing for beacon loss, and for the lower rate of transmission for each advertisement.

An embodiment of the present invention implements a routing scheme in a network that implements a layer 2.5 routing protocol that operates under the IP layer. In this embodiment, each route advertisement (RTA) includes an IP destination network. Such implementation sends RTAs in beacons and also to a frequency hopping network where all nodes are not in the same broadcast domain. Other implementations would be obvious to those of ordinary skill in the art.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for reducing transmission overhead in a first network, the method comprising:
    configuring a first node to join the first network;
    receiving a plurality of routing advertisements associated with the first network;
    transmitting the plurality of routing advertisements to a first plurality of nodes that belong to a second network and are neighbors of the first node;
    receiving an indication of interest from one or more nodes included in the first plurality of nodes in response to the plurality of routing advertisements that were transmitted,
    wherein the indication of interest indicates a first route included in the plurality of routing advertisements;
    accumulating a count of the received indications of interest;
    determining whether the count exceeds a predetermined threshold; and
    inserting the plurality of routing advertisements in a beacon packet for broadcast transmission when the count exceeds the predetermined threshold; or
    inserting the plurality of routing advertisements in a unicast packet for unicast transmission to a node in the one or more nodes when the count does not exceed the predetermined threshold.

2. The method of claim 1, wherein the first network comprises a distribution automation network.

3. The method of claim 1, wherein the first network comprises a wireless network.

4. The method of claim 3, wherein the wireless network comprises a multi-channel frequency hopping spread spectrum network.

5. The method of claim 1, wherein the first network comprises a wired network.

6. The method of claim 1, wherein the first node and the first plurality of nodes are identifiable by addresses.

7. The method of claim 6, wherein the addresses comprise either respective IPv4 addresses or respective IPv6 addresses.

8. The method of claim 1, wherein the beacon packet comprises a Media Access Control Sub-Layer Management Entity beacon packet.

9. The method of claim 1, wherein the first node comprises a utility meter capable of measuring a metered quantity.

10. The computer-implemented method of claim 1, wherein the first node provides a relay between the first plurality of nodes and the first network, and at least one node in the first plurality of nodes provides a relay between the first node and the second network.

11. A non-transitory computer-readable medium including instructions that, when executed by a processor within a first node, cause the processor to manage a first network, by performing the steps of:
   configuring the first node to join the first network;
   receiving a plurality of routing advertisements associated with the first network;
   transmitting the plurality of routing advertisements to a first plurality of nodes that belong to a second network and are neighbors of the first node;
   receiving an indication of interest from one or more nodes included in the first plurality of nodes in response to the plurality of routing advertisements that were transmitted,
   wherein the indication of interest indicates a first route included in the plurality of routing advertisements;
   accumulating a count of the received indications of interest;
   determining whether the count exceeds a predetermined threshold; and
   inserting the plurality of routing advertisements in a beacon packet for broadcast transmission when the count exceeds the predetermined threshold; or
   inserting the plurality of routing advertisements in a unicast packet for unicast transmission to a node in the one or more nodes when the count does not exceed the predetermined threshold.

12. The non-transitory computer-readable medium of claim 11, wherein the first network comprises a distribution automation network.

13. The non-transitory computer-readable medium of claim 11, wherein the first network comprises a wireless network.

14. The non-transitory computer-readable medium of claim 13, wherein the wireless network comprises a multi-channel frequency hopping spread spectrum network.

15. The non-transitory computer-readable medium of claim 11, wherein the first network comprises a wired network.

16. The non-transitory computer-readable medium of claim 11, wherein the first node and the first plurality of nodes are identifiable by addresses.

17. The non-transitory computer-readable medium of claim 16, wherein the addresses comprise either respective IPv4 addresses or respective IPv6 addresses.

18. The non-transitory computer-readable medium of claim 11, wherein the beacon packet comprises a Media Access Control Sub-Layer Management Entity beacon packet.

19. The non-transitory computer-readable medium of claim 11, wherein the first node comprises a utility meter capable of measuring a metered quantity.

20. A wireless network device, comprising:
   a transceiver circuit configured to generate a radio signal based on a first carrier signal and configured to receive a radio signal based on a second carrier signal; and
   a processor that is coupled to the transceiver circuit and configured to:
   configure the wireless network device to join a first network,
   receive a plurality of routing advertisements associated with the first network,
   transmit the plurality of routing advertisements to a first plurality of nodes that belong to a second network and are neighbors of the wireless network device,
   receive an indication of interest from one or more nodes included in the first plurality of nodes in response to the plurality of routing advertisements that were tranmitted,
   wherein the indication of interest indicates a first route included in the plurality of routing advertisement,
   accumulate a count of the received indications of interest,
   determine whether the count exceeds a predetermined threshold, and
   insert the plurality of routing advertisements in a beacon packet for broadcast transmission when the count exceeds the predetermined threshold, or
   insert the plurality of routing advertisements in a unicast packet for unicast transmission to a node in the one or more nodes when the count does not exceed the predetermined threshold.

21. The wireless network device of claim 20, wherein the first network is a distribution automation network.

22. The wireless network device of claim 20, wherein the first network is a multi-channel frequency hopping spread spectrum network.

23. The wireless network device of claim 20, wherein the wireless network device is a utility meter capable of measuring a metered quantity.

* * * * *